US011509207B2

(12) United States Patent
Parish et al.

(10) Patent No.: US 11,509,207 B2
(45) Date of Patent: Nov. 22, 2022

(54) WIRE BONDING MACHINES INCLUDING LINEAR MOTOR SYSTEMS

(71) Applicant: Kulicke and Soffa Industries, Inc., Fort Washington, PA (US)

(72) Inventors: Jesse S. Parish, North Wales, PA (US); Gregory J. Cutilli, Lafayette Hill, PA (US)

(73) Assignee: Kulicke and Soffa Industries, Inc., Fort Washington, PA (US)

( * ) Notice: Subject to any disclaimer, the term of this patent is extended or adjusted under 35 U.S.C. 154(b) by 0 days.

(21) Appl. No.: 17/752,150

(22) Filed: May 24, 2022

(65) Prior Publication Data

US 2022/0286034 A1 Sep. 8, 2022

Related U.S. Application Data

(63) Continuation of application No. 16/850,501, filed on Apr. 16, 2020, now Pat. No. 11,387,727.

(60) Provisional application No. 62/840,039, filed on Apr. 29, 2019.

(51) Int. Cl.
*H02K 41/03* (2006.01)
*H02K 35/02* (2006.01)

(52) U.S. Cl.
CPC .......... *H02K 41/031* (2013.01); *H02K 35/02* (2013.01)

(58) Field of Classification Search
CPC .... H02K 41/031; H02K 35/02; H02K 11/225; H02K 41/00; H02K 41/02; H02K 41/03
USPC ..................................................... 310/49.18
See application file for complete search history.

(56) References Cited

U.S. PATENT DOCUMENTS

| 4,868,431 | A | * | 9/1989 | Karita | H02K 41/03 318/135 |
| 5,060,841 | A | * | 10/1991 | Oshima | H01L 24/85 228/180.5 |
| 6,163,091 | A | * | 12/2000 | Wasson | H02K 41/03 310/12.22 |
| 6,744,155 | B1 | * | 6/2004 | Stoiber | H02K 41/02 310/15 |
| 2002/0050426 | A1 | | 5/2002 | Yamamoto et al. | |

(Continued)

OTHER PUBLICATIONS

International Search Report dated Jul. 28, 2020, from International Application No. PCT/US2020/028479.

(Continued)

*Primary Examiner* — Ahmed Elnakib
(74) *Attorney, Agent, or Firm* — Christopher M. Spletzer, Sr.

(57) ABSTRACT

A wire bonding system is provided including a bond head assembly carrying a wire bonding tool. A wire bonding system also includes a linear motor system for driving the bond head assembly along a first horizontal axis. The linear motor system includes a moving magnet assembly including a magnet track and a plurality of permanent magnets coupled to the magnet track; a coil assembly arranged around the moving magnet assembly, the coil assembly including a plurality of teeth having first slots therebetween, the coil assembly also including a plurality of coils at least partially disposed in at least a portion of the slots; a position encoder system; a damper element positioned between the coil assembly and a base structure of the linear motor system; and a spring element positioned between the coil assembly and the base structure of the linear motor system.

18 Claims, 17 Drawing Sheets

(56) References Cited

U.S. PATENT DOCUMENTS

| | | | |
|---|---|---|---|
| 2002/0113498 A1* | 8/2002 | Emoto | H02K 9/227 |
| | | | 310/12.25 |
| 2002/0117903 A1* | 8/2002 | Uchida | H02K 41/03 |
| | | | 310/12.24 |
| 2006/0012251 A1 | 1/2006 | Miyata et al. | |
| 2006/0232141 A1 | 10/2006 | Teramachi et al. | |
| 2007/0096567 A1 | 5/2007 | Miyamoto et al. | |
| 2008/0041244 A1 | 2/2008 | Sakamoto | |
| 2009/0250503 A1* | 10/2009 | Schmidt-Lange | |
| | | | H01L 21/67138 |
| | | | 228/1.1 |
| 2010/0176663 A1 | 7/2010 | Lykkegaard | |
| 2010/0225179 A1 | 9/2010 | Wang | |
| 2015/0180291 A1 | 6/2015 | Senoo | |
| 2016/0351535 A1* | 12/2016 | Sekine | H01L 24/85 |
| 2018/0240774 A1* | 8/2018 | DeAngelis | H01L 24/75 |
| 2019/0319005 A1* | 10/2019 | DeAngelis | H01L 24/75 |
| 2020/0343802 A1* | 10/2020 | Parish | H02K 11/225 |
| 2021/0257330 A1* | 8/2021 | DeAngelis | B23K 1/0016 |

OTHER PUBLICATIONS

Basics of the Electric Servomotor and Drive. George Ellis, in Control System Design Guide (Fourth Edition), 2012.

Direct Current Power Transmission, High Voltage. Narain G. Hingorani, A. Figueroa, in Encyclopedia of Physical Science and Technology (Third Edition), 2003.

* cited by examiner

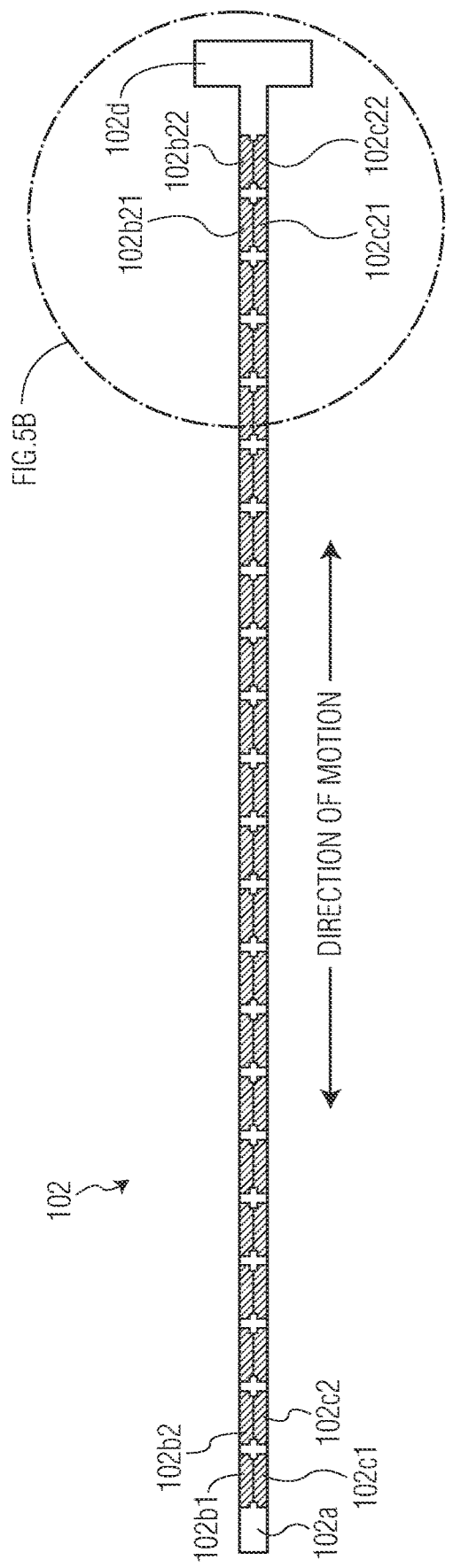

WIRE BONDING MACHINES INCLUDING LINEAR MOTOR SYSTEMS

CROSS-REFERENCE TO RELATED APPLICATIONS

This application is a continuation application of U.S. patent application Ser. No. 16/850,501, filed Apr. 16, 2020, which claims the benefit of U.S. Provisional Application No. 62/840,039, filed Apr. 29, 2019, the contents of both of which are incorporated herein by reference.

FIELD

The invention relates to linear motor systems, and more particularly, to improved linear motors including moving magnet assemblies.

BACKGROUND

Linear motors are well known in the art and used in many different industries. For example, linear motor systems are used in wire bonding machines to provide high speed linear motion along various axes. For example, in certain wire bonding machines, linear motors are used to provide precise high speed motion along an x-axis and a y-axis of the machine. Exemplary patents illustrating examples of linear motion systems include: U.S. Pat. No. 7,825,549 to Wang (titled "LINEAR MOTOR WITH REDUCED COGGING"), U.S. Pat. No. 4,912,746 to Oishi (titled "LINEAR DC BRUSHLESS MOTOR"), U.S. Pat. No. 5,642,013 to Wavre (titled "PERMANENT-MAGNET SYNCHRONOUS MOTOR") and U.S. Pat. No. 5,910,691 to Wavre (titled "PERMANENT-MAGNET LINEAR SYNCHRONOUS MOTOR").

There is continuous interest in providing improvements in the operation of linear motors, in areas such as noise reduction, vibration reduction, speed, force, efficiency, accuracy, and cost of the motor. Thus, it would be desirable to provide improved linear motors.

SUMMARY

According to an exemplary embodiment of the invention, a linear motor is provided. The linear motor includes a moving magnet assembly including (i) a magnet track, (ii) a first plurality of permanent magnets coupled to the magnet track, and (iii) a second plurality of permanent magnets coupled to the magnet track and arranged below the first plurality of permanent magnets. The linear motor also includes a first coil assembly arranged above the moving magnet assembly. The first coil assembly includes a first plurality of teeth having first slots therebetween. The first coil assembly also includes a first plurality of coils at least partially disposed in at least a portion of the first slots. The linear motor also includes a second coil assembly arranged below the moving magnet assembly. The second coil assembly includes a second plurality of teeth having second slots therebetween. The second coil assembly includes a second plurality of coils at least partially disposed in at least a portion of the second slots.

According to another exemplary embodiment of the invention, a wire bonding system is provided. The wire bonding system includes a bond head assembly carrying a wire bonding tool and a linear motor system for driving the bond head assembly along a first horizontal axis. The linear motor system includes a moving magnet assembly having (i) a magnet track, (ii) a first plurality of permanent magnets coupled to the magnet track, and (iii) a second plurality of permanent magnets coupled to the magnet track and arranged below the first plurality of permanent magnets. The linear motor system also includes a first coil assembly arranged above the moving magnet assembly. The first coil assembly includes a first plurality of teeth having first slots therebetween. The first coil assembly also includes a first plurality of coils at least partially disposed in at least a portion of the first slots. The linear motor system also includes a second coil assembly arranged below the moving magnet assembly. The second coil assembly includes a second plurality of teeth having second slots therebetween. The second coil assembly includes a second plurality of coils at least partially disposed in at least a portion of the second slots.

Other machines (besides wire bonding machines) are contemplated within the scope of the invention, to include the inventive linear motors. Examples of such machines include die attach machines, flip chip bonding machines, thermocompression bonding machines, pick and place machines, and other semiconductor packaging machines.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures:

FIG. 5A is a cross-sectional view of a moving magnet assembly in accordance with an exemplary embodiment of the invention;

DETAILED DESCRIPTION

As used herein, the terms "linear motor", "linear motor system", and "linear motion system" may be considered synonyms. For example, FIGS. 1A-1C, 2A-2B, 3A-3B, and 4A-4B illustrate respective linear motors 100a, 100b, 100c, and 100d. While FIG. 6 refers to a linear motor system 600, and FIG. 7 refers to a linear motion system 700, each of these may also be considered a "linear motor" within the scope of the invention.

As used herein, the term "magnet track" is intended to refer to any of a number of structures in a linear motor carrying a plurality of permanent magnets arranged to magnetically interact with a coil assembly of the linear motor such that a desired linear motion of at least one of the magnet track and the coil assembly is provided. As such, the magnet track is not intended to be limited, for example, to any particular arrangement or spacing of the permanent magnets, nor is the magnet track intended to be limited to any particular support structure for the permanent magnets.

Figure 1A:
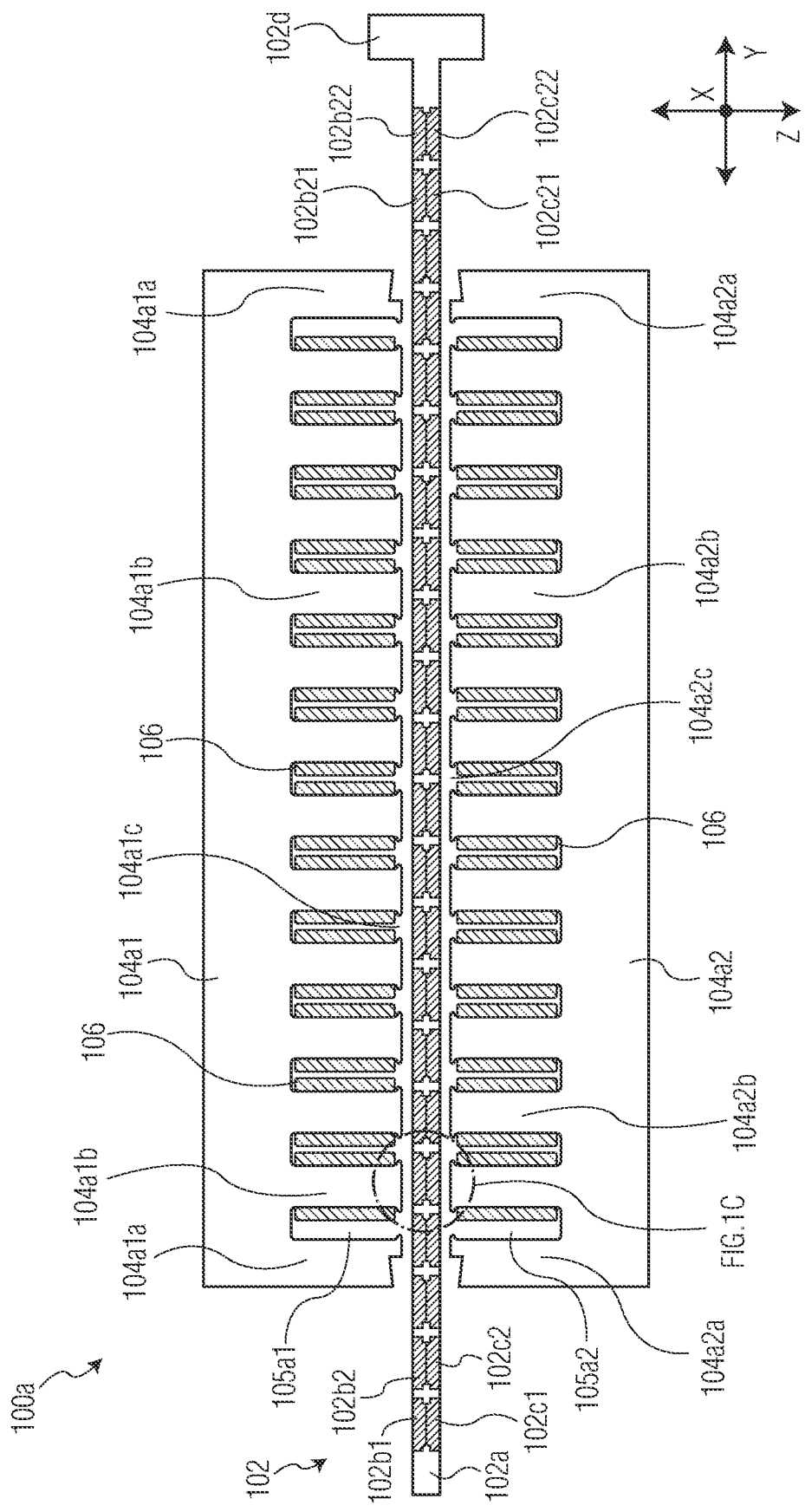
FIG. 1A is a cross-sectional view of a linear motor in accordance with an exemplary embodiment of the invention.

FIG. 1A is a cross sectional view of linear motor 100a. Linear motor 100a includes moving magnet assembly 102, first coil assembly 104a1, and second coil assembly 104a2. As is understood by those skilled in the art, certain components of linear motor 100a (e.g., electrical connections, etc.) have been omitted for simplicity. Moving magnet assembly 102 includes (i) a magnet track 102a, (ii) a first plurality of permanent magnets 102b1, 102b2, . . . , 102b21, 102b22 coupled to magnet track 102a, and (iii) a second plurality of permanent magnets 102c1, 102c2, . . . , 102c21, 102c22 coupled to magnet track 102a and arranged below the first plurality of permanent magnets 102b1, 102b2, . . . , 102b22. As shown in FIG. 1A, the permanent magnets are arranged in magnet pairs, one disposed directly above the other. For example, permanent magnet 102b1 is positioned directly above permanent magnet 102c1, such that permanent magnets 102b1 and 102c1 form a "magnet pair". According to exemplary aspects of the invention, magnetic attraction forces may exist between each magnet pair.

Magnet track 102a (and any of the other magnet tracks described in this patent application) may be formed from a non-magnetic material (e.g., a material including aluminum such as aluminum or an aluminum alloy). Other exemplary non-magnetic materials include carbon fiber, beryllium, as well as many others.

Each of the first plurality of permanent magnets 102b1, 102b2, . . . , 102b22, and each of the second plurality of permanent magnets 102c1, 102c2, . . . , 102c22, are connected (directly or indirectly) to magnet track 102a using any of a number of techniques such as an adhesive, fasteners, etc. Magnet track 102a includes a coupling portion 102d for connecting to another structure to be moved along the desired axis by linear motor 100a. For example, coupling portion 102d may be connected to a y-axis slide of a wire bonding machine for moving a bond head assembly along the y-axis (e.g., see FIG. 8).

Linear motor 100a also includes a first coil assembly 104a1 (which may also be referred to as stator 104a1) arranged above moving magnet assembly 102. First coil assembly 104a1 includes a first plurality of teeth having first slots 105a1 therebetween. The first plurality of teeth include end teeth 104a1a at each end of first coil assembly 104a1, and a plurality of teeth 104a1b disposed between the two end teeth 104a1a. First coil assembly also includes coils 106 at least partially disposed in at least a portion of the first slots 105a1. As shown in FIG. 1A (and more clearly shown in FIG. 1B), each slot 105a1 (except the end slots adjacent end teeth 104a1a, which has received a portion of only one coil 106) has received a portion of two adjacent coils 106. Linear motor 100a also includes a second coil assembly 104a2 (which may also be referred to as stator 104a2) arranged below moving magnet assembly 102. Second coil assembly 104a2 includes a second plurality of teeth having second slots 105a2 therebetween. The second plurality of teeth include end teeth 104a2a at each end of second coil assembly 104a2, and a plurality of teeth 104a2b disposed between the two end teeth 104a2a. Second coil assembly 104a2 also includes coils 106 at least partially disposed in at least a portion of the second slots 105a2. As shown in FIG. 1A (and more clearly shown in FIG. 1B), each slot 105a2 (except the end slots adjacent end teeth 104a2a, which has received a portion of only one coil 106) has received a portion of two adjacent coils 106.

Each of first coil assembly 104a1 and second coil assembly 104a2 may include a plurality of laminations stacked together as is known to those skilled in the art. Thus, the stacked laminations define the respective first plurality of teeth 104a1a, 104a1b and the second plurality of teeth 104a2a, 104a2b.

Figure 1B:
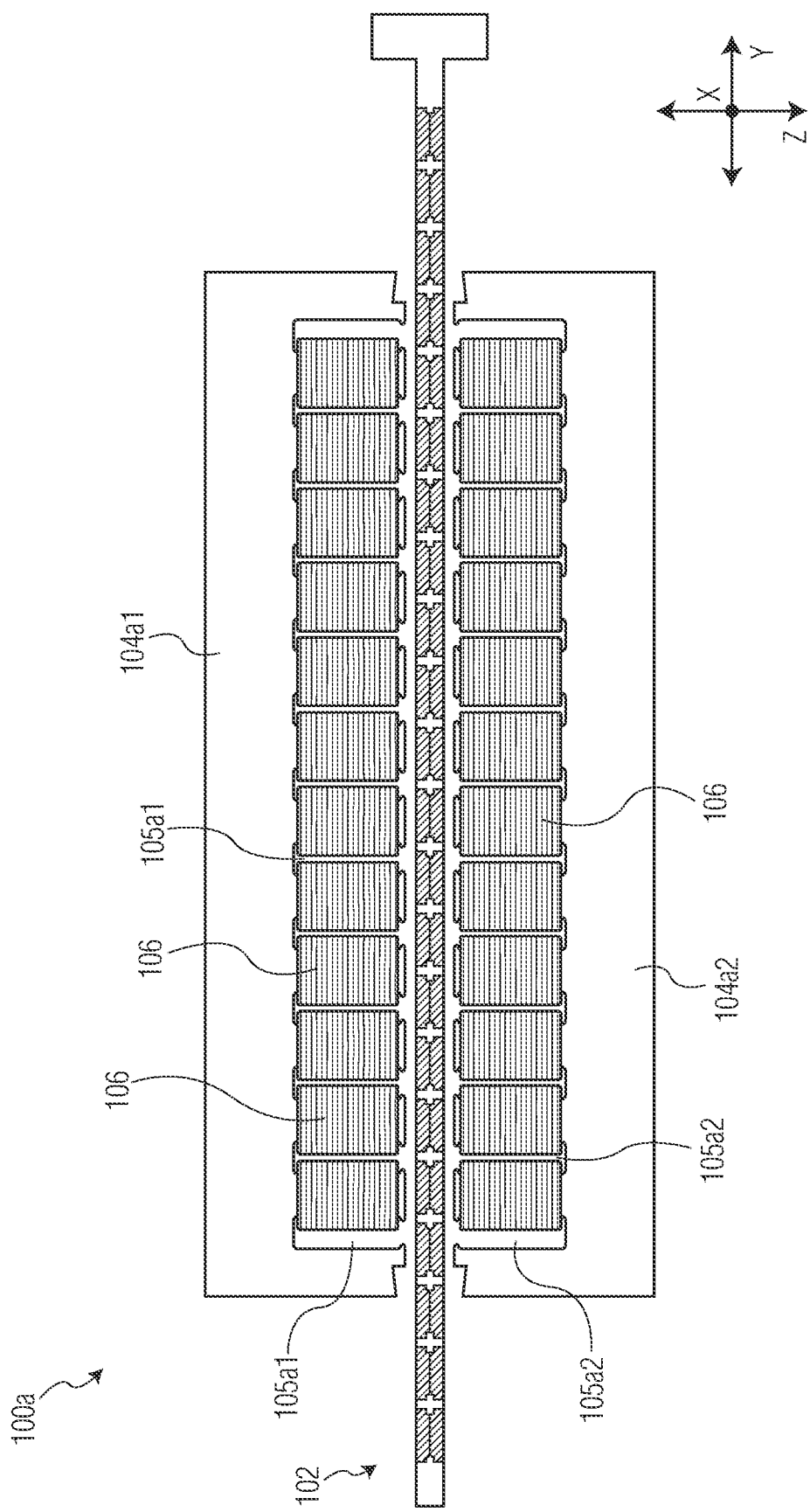
FIG. 1B is a combination side and cross-sectional view of the linear motor of FIG. 1A.
Figure 1C:
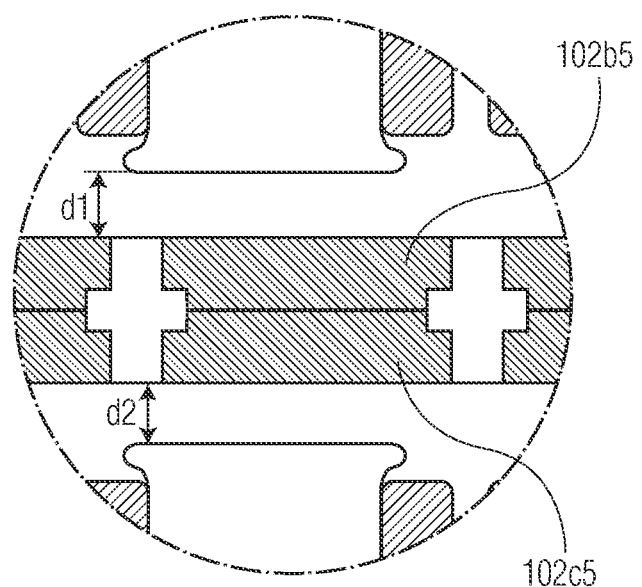
FIG. 1C is a detailed view of a portion of FIG. 1A.

As shown in FIG. 1C, an exposed surface of each of the first plurality of permanent magnets 102b1, 102b2, . . . , 102b22 is positioned adjacent first coil assembly 104a1 at a first distance d1, and an exposed surface of each of the second plurality of permanent magnets 102c1, 102c2, . . . , 102c22 is positioned adjacent the second coil assembly 104a2 at a second distance d2. The first distance d1 is substantially the same as the second distance d2.

To the extent possible, the features described above with respect to FIGS. 1A-1C are applicable to the additional embodiments of the invention described herein (and other embodiments within the scope of the invention). Thus, in connection with the remaining embodiments, certain details are omitted for simplicity, and certain reference numerals are duplicated across the various illustrated embodiments of the invention.

FIGS. 1A-1C illustrate first coil assembly 104a1 and second coil assembly 104a2, having teeth 104a1a, 104a1b, 104a2a, and 104a2b. End teeth 104a1a, 104a2a have a shape as shown in U.S. Pat. No. 7,825,549. Teeth 104a1b, 104a2b have a "T" shaped configuration where the end of each tooth is wider than the body of the respective tooth (see FIG. 1A, where gap 104a1c, and gap 104a2c, between adjacent teeth are smaller at the end because of the "T" shape). Of course, these teeth designs are exemplary in nature, and the invention is not limited to such configurations.

Figure 2A:
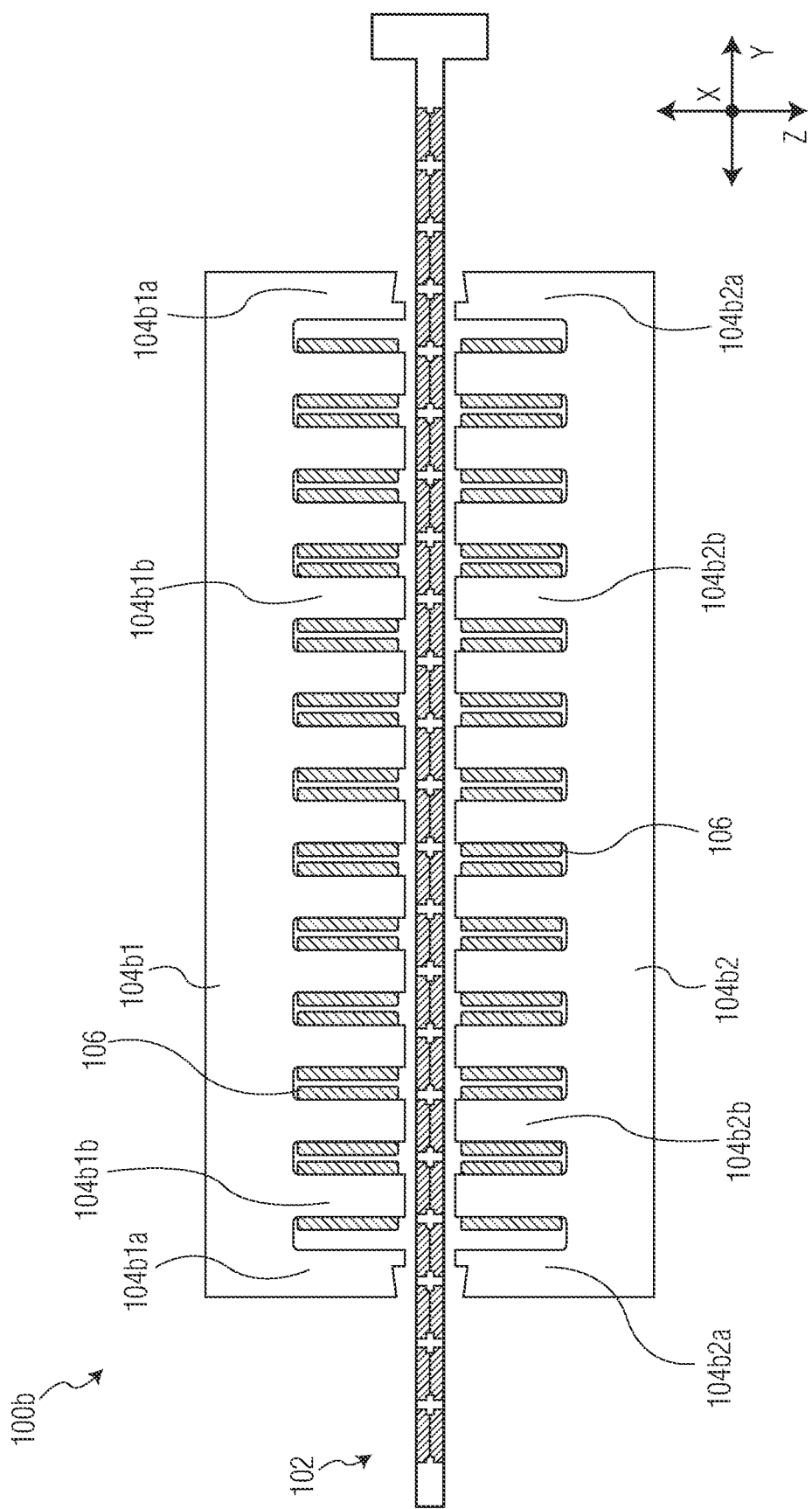
FIG. 2A is a cross-sectional view of another linear motor in accordance with another exemplary embodiment of the invention.
Figure 2B:
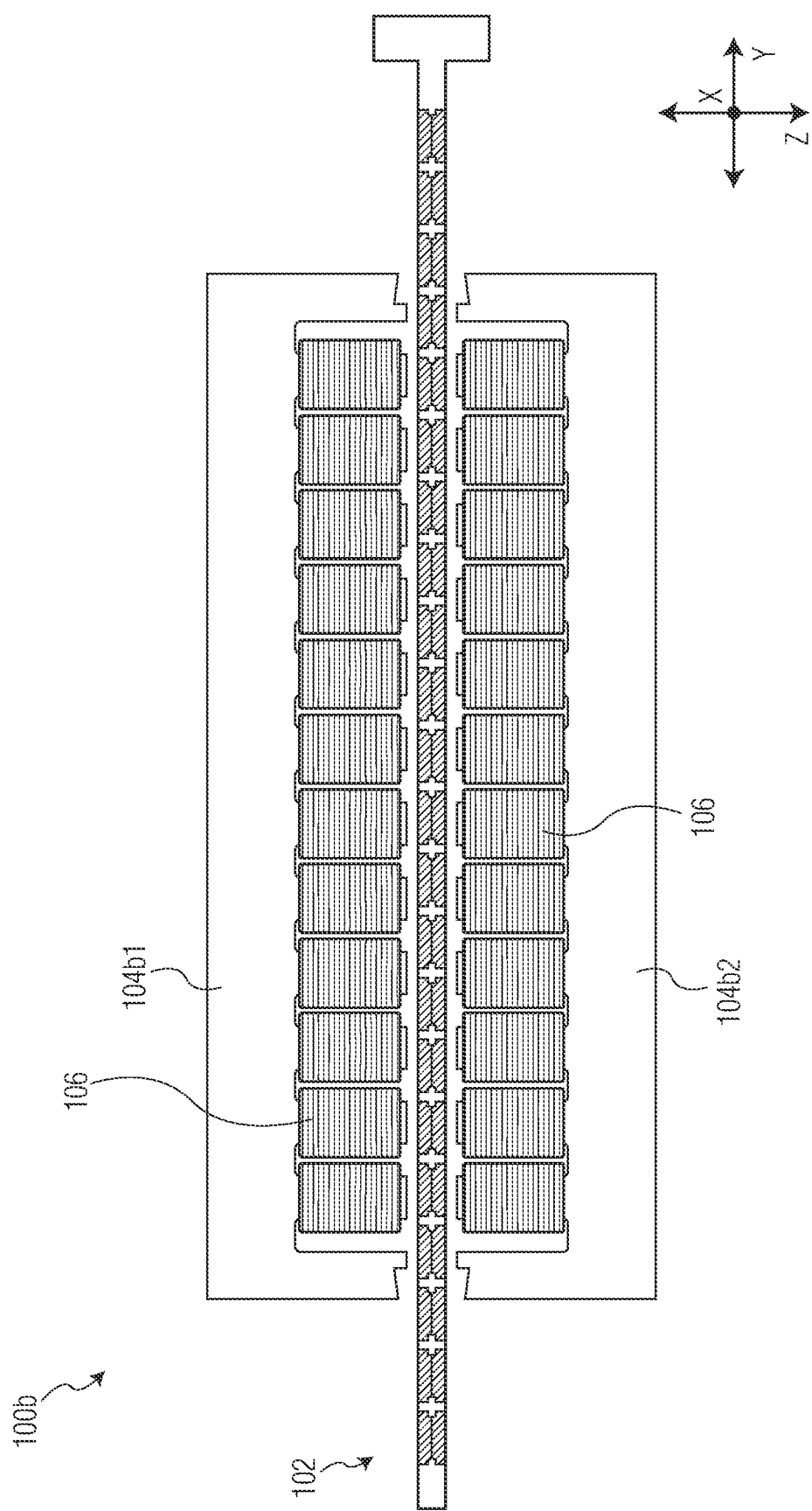
FIG. 2B is a combination side and cross-sectional view of the linear motor of FIG. 2A.

FIGS. 2A-2B illustrate linear motor 100b which is very similar to linear motor 100a described above with respect to FIGS. 1A-1B. Linear motor 100b includes a magnet assembly 102 which is the same as magnet assembly 102 from FIGS. 1A-1B. Linear motor also includes first coil assembly 104b1 (including teeth 104b1a, 104b1b) and second coil assembly 104b2 (including teeth 104b2a, 104b2b), which are very similar to first coil assembly 104a1 and second coil assembly 104a2 from FIGS. 1A-1B. One difference is that in FIGS. 2A-2B teeth 104b1b, 104b2b do not have the "T"

shaped configuration described above. Rather, teeth 104b1b, 104b2b have the same (or substantially the same) width along their entire length, which makes positioning of coils 106 relatively simple.

Figure 3A:
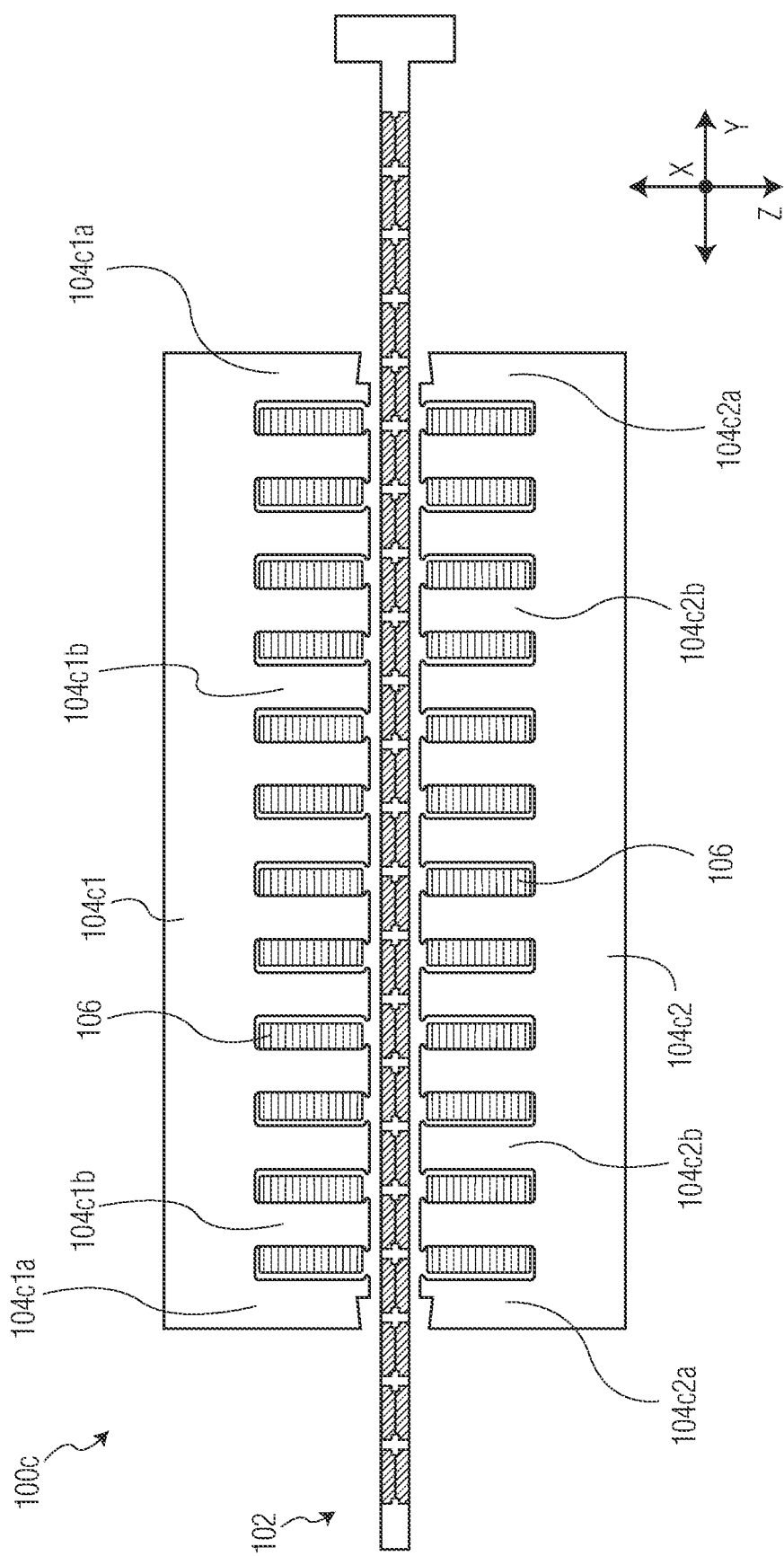
FIG. 3A is a cross-sectional view of yet another linear motor in accordance with another exemplary embodiment of the invention.
Figure 3B:
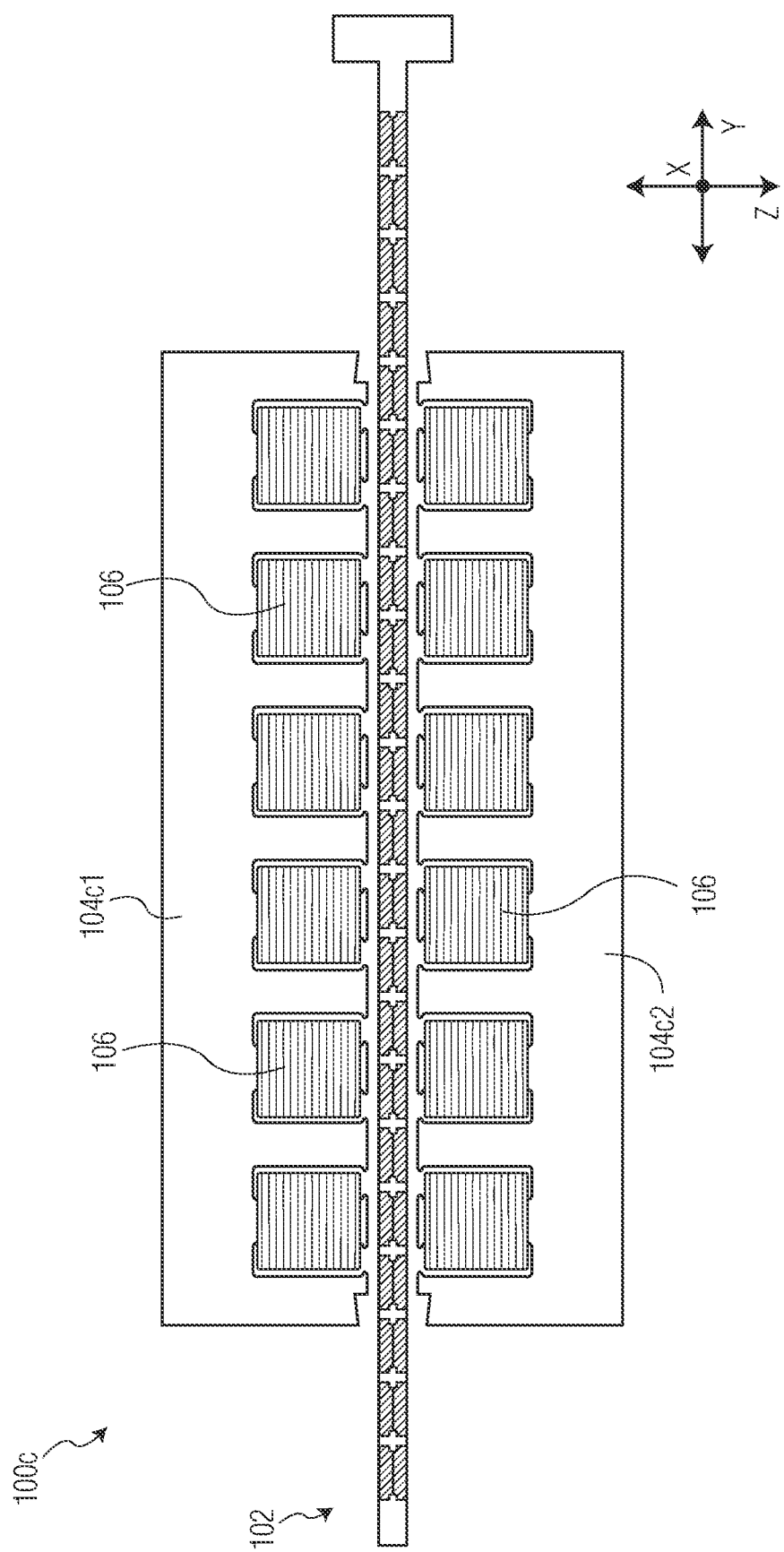
FIG. 3B is a combination side and cross-sectional view of the linear motor of FIG. 3A.

FIGS. 3A-3B illustrate linear motor 100c which is very similar to linear motor 100a described above with respect to FIGS. 1A-1B. Linear motor 100c includes a magnet assembly 102 which is the same as magnet assembly 102 from FIGS. 1A-1B. Linear motor also includes first coil assembly 104c1 (including teeth 104c1a, 104c1b) and second coil assembly 104c2 (including teeth 104c2a, 104c2b), which are very similar to first coil assembly 104a1 and second coil assembly 104a2 from FIGS. 1A-1B. However, in FIGS. 3A-3B, only one coil 106 is provided in each slot (See FIG. 3B for clarity). Thus, in the example shown in FIGS. 3A-3B, six coils 106 are provided, whereas in FIGS. 1A-1B twelve coils 106 are provided.

Figure 4A:
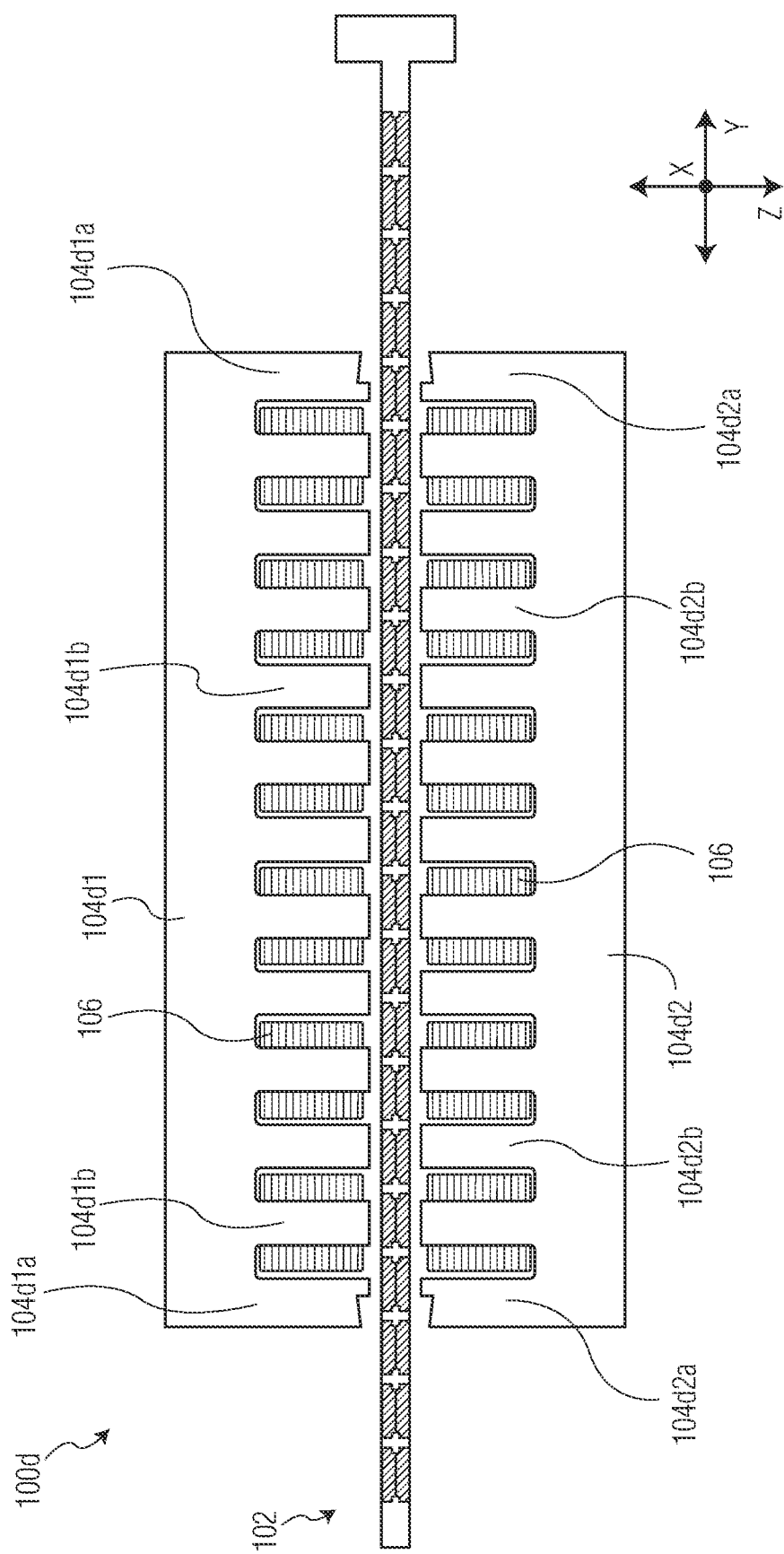
FIG. 4A is a cross-sectional view of yet another linear motor in accordance with another exemplary embodiment of the invention.
Figure 4B:
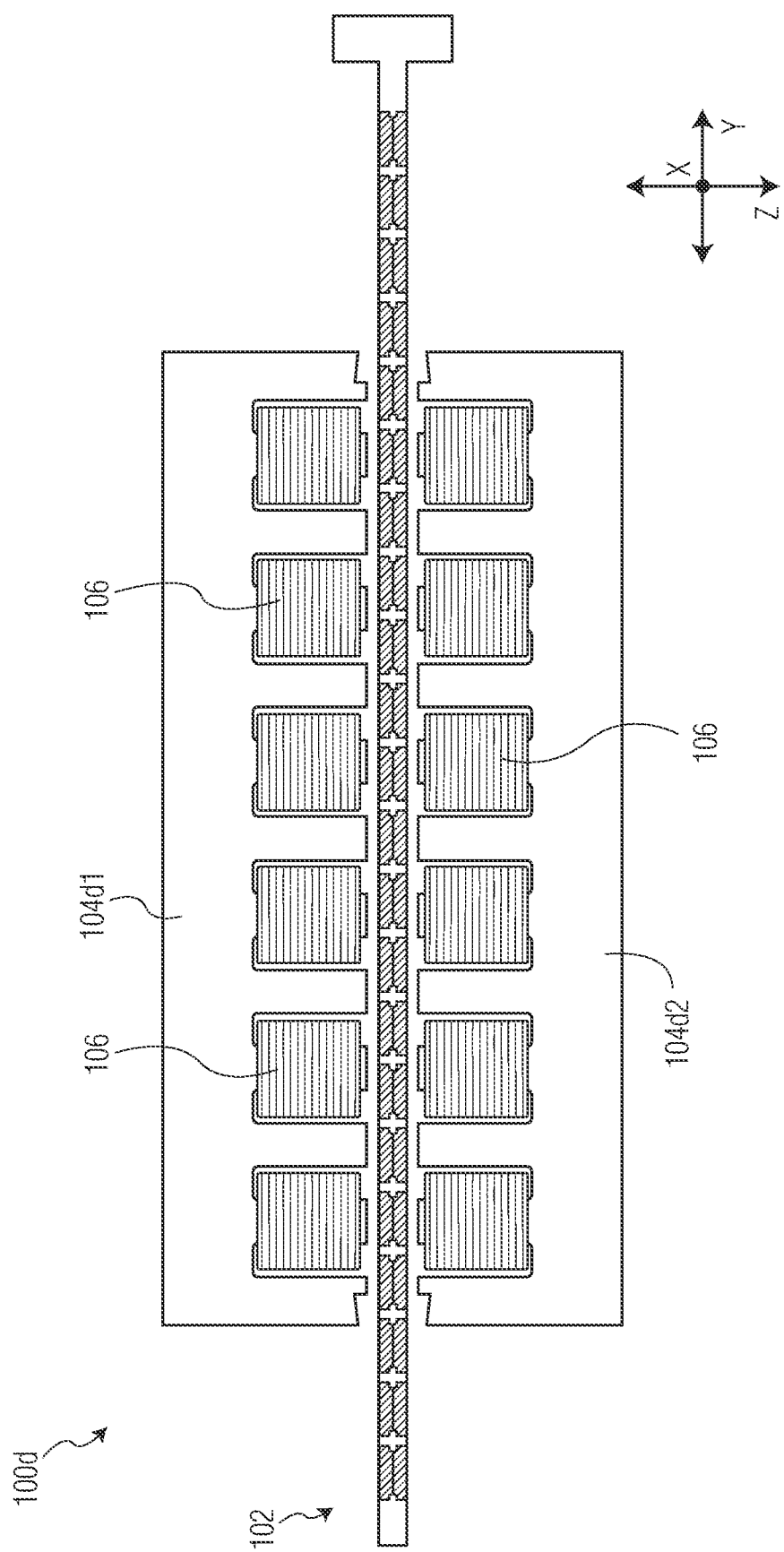
FIG. 4B is a combination side and cross-sectional view of the linear motor of FIG. 4A.

FIGS. 4A-4B illustrate linear motor 100d which is very similar to linear motor 100a described above with respect to FIGS. 1A-1B. Linear motor 100d includes a magnet assembly 102 which is the same as magnet assembly 102 from FIGS. 1A-1B. Linear motor 100d also includes first coil assembly 104d1 (including teeth 104d1a, 104d1b) and second coil assembly 104d2 (including teeth 104d2a, 104d2b), which are very similar to first coil assembly 104a1 and second coil assembly 104a2 from FIGS. 1A-1B. However, like FIGS. 3A-3B, in FIGS. 4A-4B, only one coil 106 is provided in each slot (See FIG. 4B for clarity). Thus, in the example shown in FIGS. 4A-4B, six coils 106 are provided, whereas in FIGS. 1A-1B twelve coils 106 are provided. Another difference is that in FIGS. 4A-4B teeth 104d1b, 104d2b do not have the "T" shaped configuration described above with respect to FIGS. 1A-1B. Rather, teeth 104d1b, 104d2b have the same (or substantially the same) width along their entire length, which makes positioning of coils 106 relatively simple.

Figure 5B:
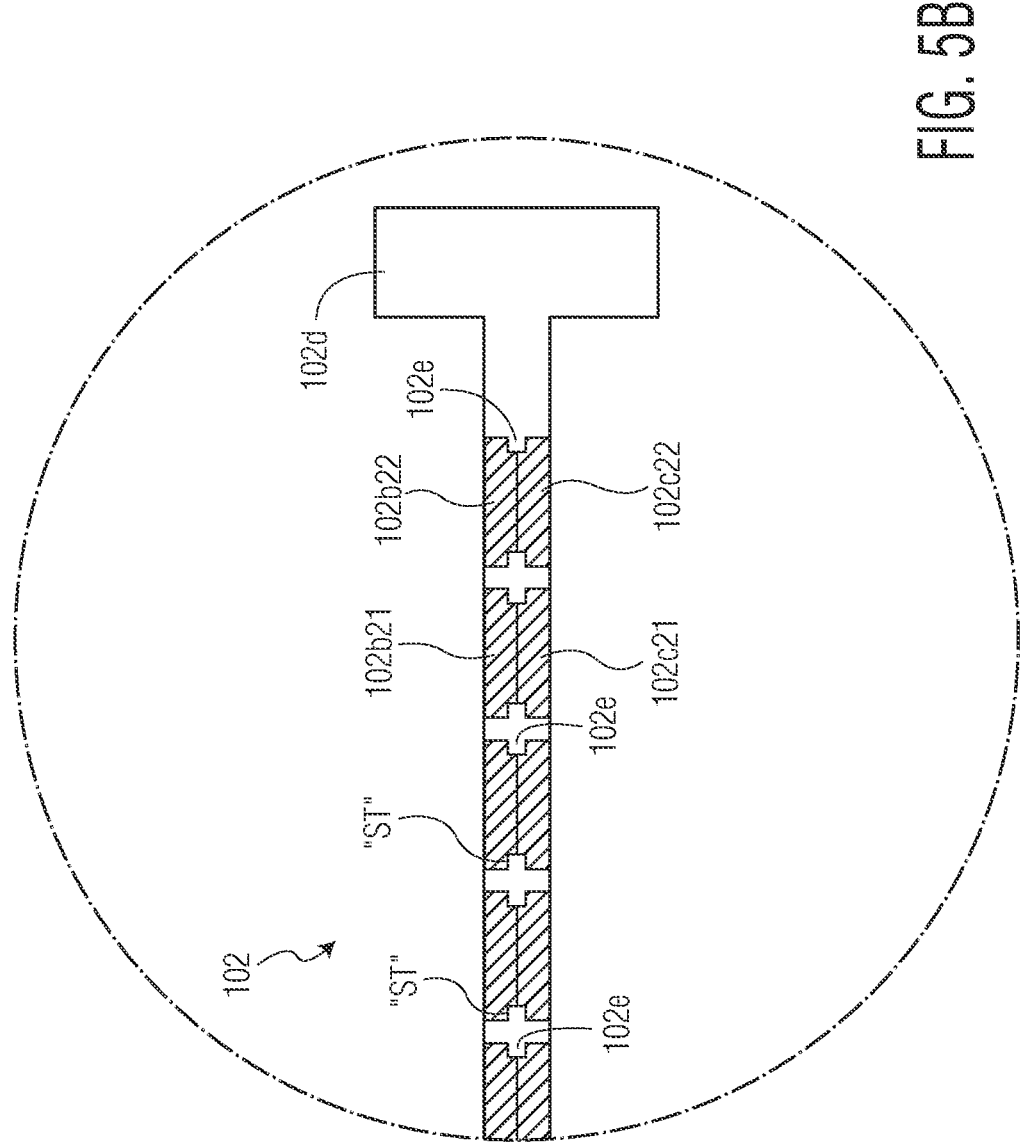
FIG. 5B is a detailed view of a portion of FIG. 5A.
Figure 5C:
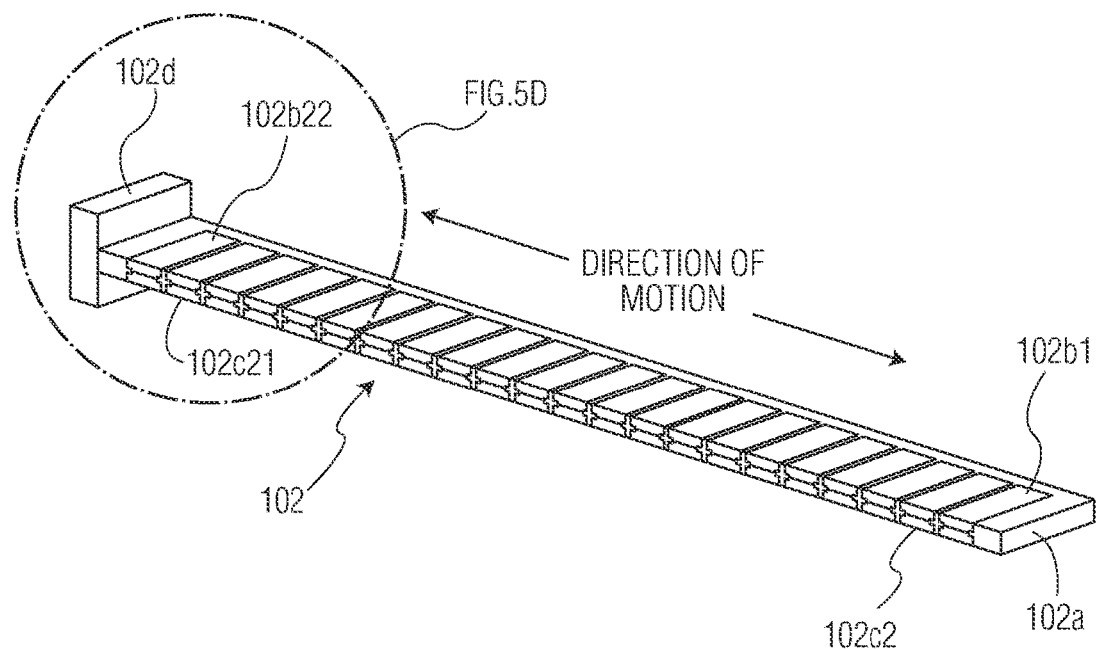
FIG. 5C is a perspective cross-sectional view of the moving magnet assembly of FIG. 5A.
Figure 5D:
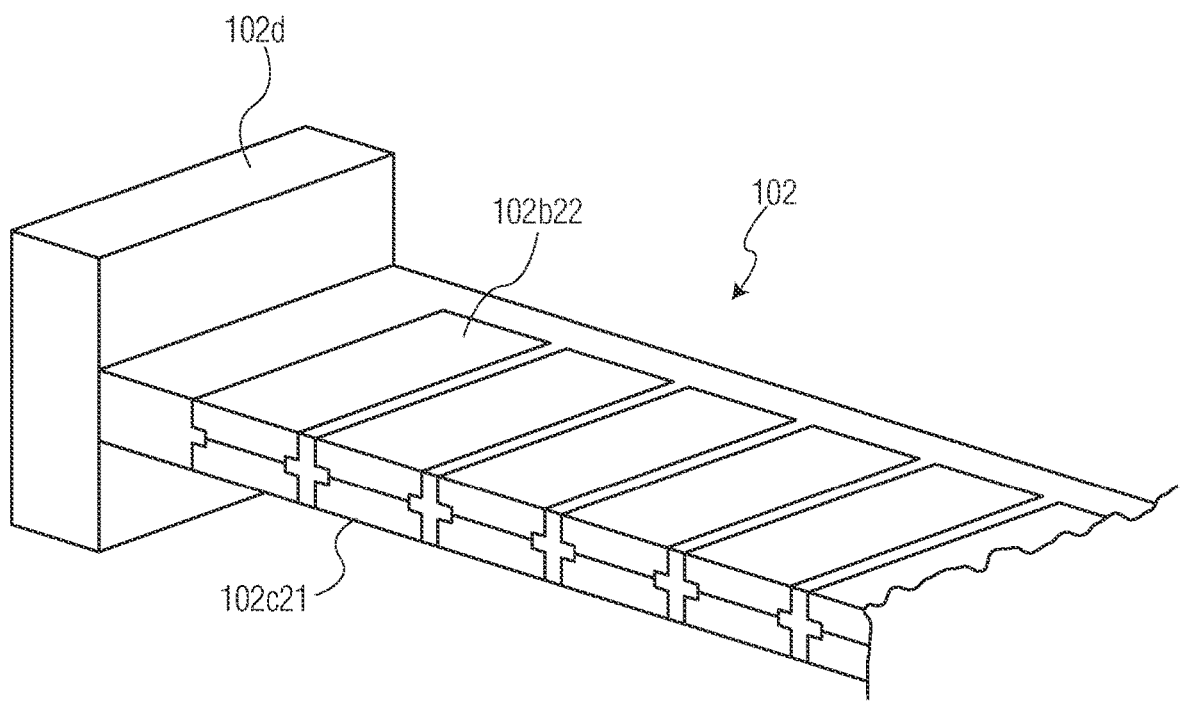
FIG. 5D is a detailed view of a portion of FIG. 5C.
Figure 5E:
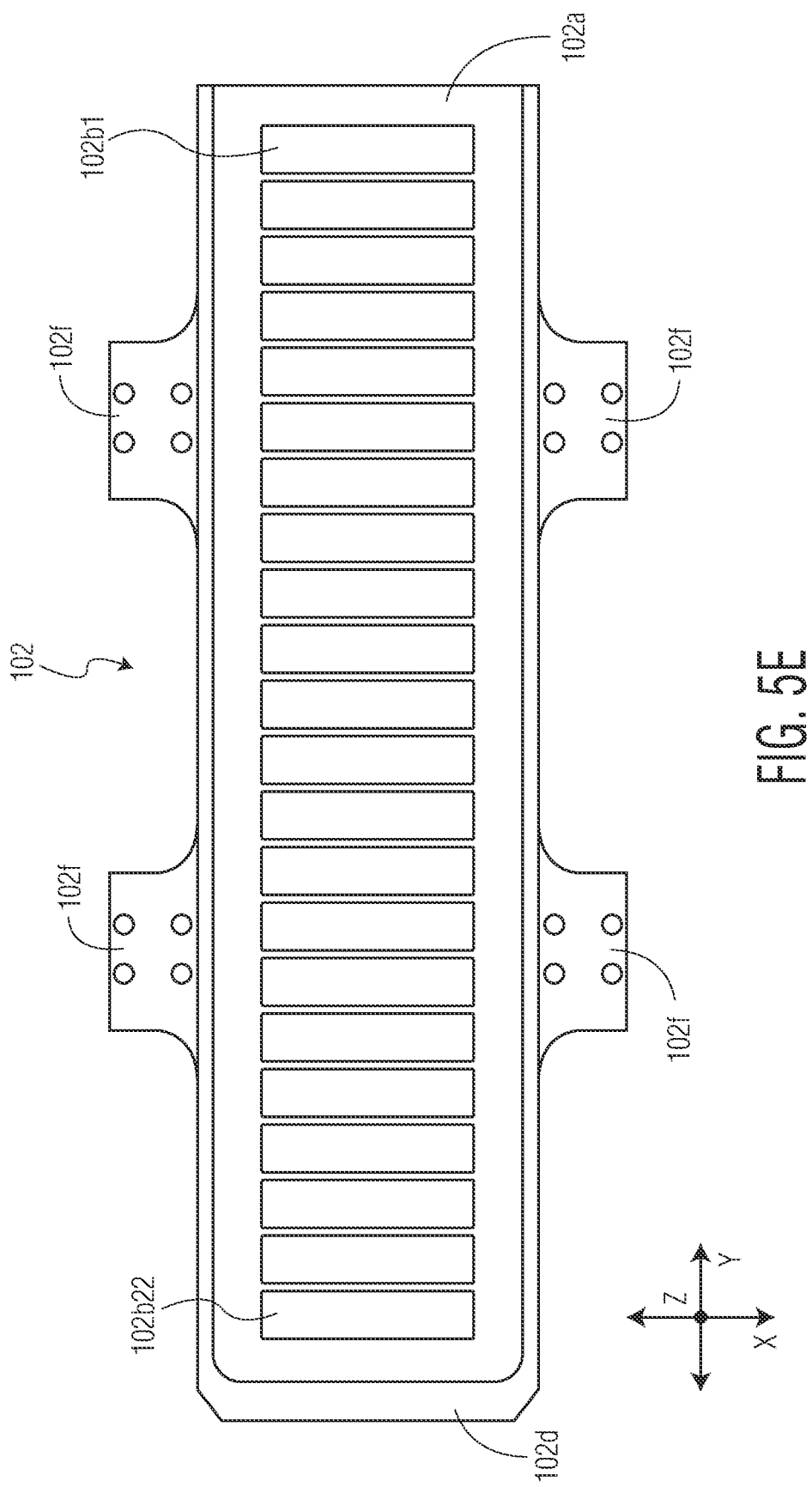
FIG. 5E is a top view of the moving magnet assembly of FIG. 5A.

FIGS. 5A-5E illustrate various details of magnet assembly 102. FIG. 5A illustrates a cross-sectional view of magnet assembly 102 shown in FIGS. 1A-1C, 2A-2B, 3A-3B, and 4A-4B, along with the direction of motion (along the y-axis in the examples shown in the application). FIG. 5B is a detailed view of a portion of FIG. 5A, which clearly illustrates certain features of magnet assembly. Specifically, FIG. 5B illustrates that magnet track 102a defines a plurality of tab portions 102e. As shown in FIG. 5B, each of the first plurality of permanent magnets 102b1, 102b2, . . . , 102b22 and the second plurality of permanent magnets 102c1, 102c2, . . . , 102c22 includes a stepped portion "ST" configured to mate with corresponding ones of the plurality of tab portions 102e. FIGS. 5C-5D provide additional perspective cross sectional views of magnet assembly 102. FIG. 5E illustrates a top view of magnet assembly 102 (not a cross sectional view, as in FIGS. 5A-5D). In FIG. 5E, connection portions 102f of magnet assembly 102 are visible. Connection portions 102f are used to engage some type of bearing assembly (see bearings 606, and bearing block 604, shown in FIG. 6) to assist in the motion of moving magnet assembly 102. For example, the bearing assembly could be a linear bearing block engaged with a linear bearing rail. Of course, other types of bearing assemblies are contemplated.

According to certain aspects of the invention, the design of the substrate (i.e., the magnet track) carrying the plurality of permanent magnets (including both the first and second plurality of permanent magnets) of the moving magnet assembly 102 is important. It may be particularly beneficial that the magnets are carried without a cover or skin between the magnets and the respective stator (i.e., between the first plurality of permanent magnets and the first coil assembly, and between the second plurality of permanent magnets and the second coil assembly). This lack of an inclusion of a cover or skin substantially reduces the electrical and mechanical gap between the magnets and the respective stator, and further reduces unnecessary mass in the linear motor. Further still, such a substrate (i.e., the magnet track) does not appreciably interfere with the magnetic flux path.

Further still, the design of moving magnet assembly 102 (including symmetric magnet pairs disposed one above the other), along with the dual stator design (including the first coil assembly and the second coil assembly) desirably creates a substantially equal force constant for each stator, and creates a substantially equal and opposite magnetic attraction force to each stator. This results in a minimal (substantially net zero) load on the moving magnet assembly 102 and the associated bearings.

Figure 6:
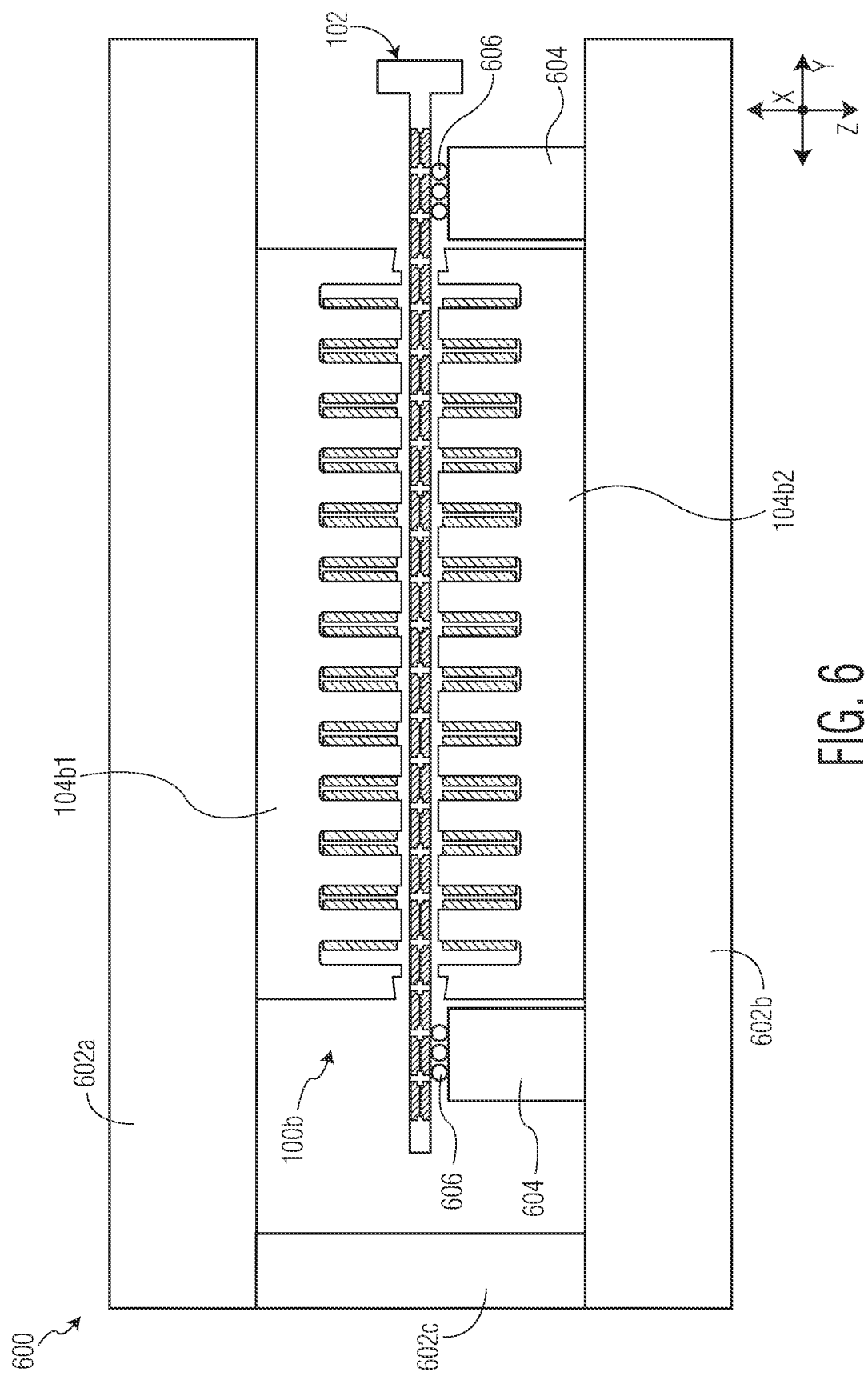
FIG. 6 is a cross-sectional view of another linear motor in accordance with an exemplary embodiment of the invention.

FIG. 6 illustrates a linear motor system 600 with additional components. While linear motor system 600 includes linear motor 100b from FIGS. 2A-2B, it is understood that any other linear motor within the scope of the invention (e.g., linear motor 100a, 100c, 100d, or any other linear motor within the scope of the invention) may be included in linear motor system 600. Linear motor system 600 includes housing portions 602a, 602b, and 602c. Collectively, housing portions 602a, 602b, and 602c are part of a common housing, where the common housing couples (either directly or indirectly) first coil assembly 104b1 with second coil assembly 104b2 to provide a combined coil assembly. For example, first coil assembly 104b1 and second coil assembly 104b2 may be secured in the common housing using adhesive, fasteners, a combination of both, among other techniques. It is understood that a common housing for first coil assembly 104b1 and second coil assembly 104b2 may take any desired configuration (e.g., a single piece, or multiple different pieces, of material and not three distinct housing portions as shown). FIG. 6 also illustrates bearings 606 supported by bearing blocks 604 (where bearing blocks 604 may be considered to be part of the combined coil assembly). Through operation of linear motor system 600, moving magnet assembly 102 moves along the Y axis, while riding along bearings 606.

Figure 7:
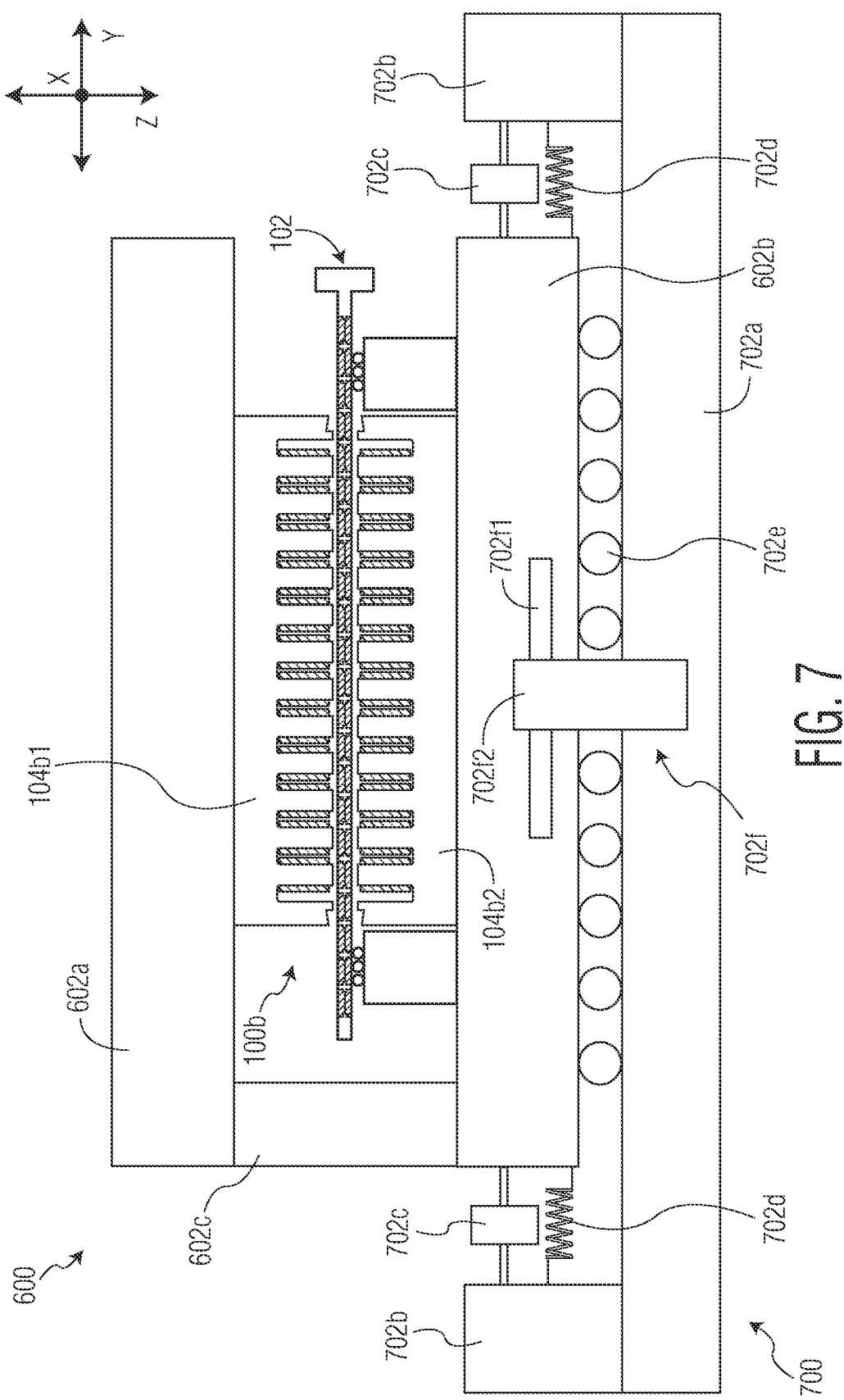
FIG. 7 is a cross-sectional view of yet another linear motor in accordance with an exemplary embodiment of the invention.

FIG. 7 illustrates linear motion system 700 which includes linear motor system 600 from FIG. 6. While FIG. 7 illustrates linear motor system 600 including linear motor 100b from FIGS. 2A-2B, it is understood that any other linear motor within the scope of the invention (e.g., linear motor 100a, 100c, 100d, or any other linear motor within the scope of the invention) may be included in linear motor system 600. During operation of linear motion system 700, motion of the moving magnet assembly 102 along a horizontal axis (the Y axis shown in FIG. 7) results in some resultant motion of the combined coil assembly (including housing portions 602a, 602b, and 602c, as well as first coil assembly 104b1 and second coil assembly 104b2) along the same horizontal axis. In the block diagram view of FIG. 7, this motion is provided for via bearings 702e. More specifically, linear motion system 700 includes base structure 702a, side block portions 702b, dampers 702c, springs 702d, and bearings 702e. Bearings 702e are supported by base structure 702a. Springs 702d and dampers 702c are provided between the common housing (including housing portions 602a, 602b, and 602c, and the combined coil assembly) and side block portions 702b. Springs 702d assist in re-centering the common housing (including the combined coil assembly of first coil assembly 104b1 and second coil assembly 104b2) after motion of moving magnet assembly 102.

Dampers 702c assist in controlling stability of linear motion system 700 in connection with motion of moving magnet assembly 102.

FIG. 7 also illustrates a position encoder system 702f for providing position information related to the combined coil assembly (including first coil assembly 104b1 and second coil assembly 104b2). Position encoder system 702f (including elements 702f1 and 702f2) may be any of a number of types of position encoder systems (e.g., an optical encoder system, a magnetic encoder system, etc.). Position encoder system 702f, shown in FIG. 7, may be considered of varying type of position encoder system. For example, in an optical encoder system, a scale portion 702f1 is provided coupled (either directly or indirectly) to the combined coil assembly, and an optical portion 702f2 is provided for imaging the scale portion. In such an example, optical portion 702f2 is coupled (either directly or indirectly) to another portion of linear motion system 700 (e.g., base portion 702a) that does not move with the combined coil assembly. In another example, elements 702f1 and 702f2 may be portions of a magnetic encoder system.

In any event, inclusion of position encoder system 702f may be particularly beneficial if linear motor 100b is a three phase motor, where the position information provided by position encoder system 702f is used to control a commutation angle of linear motor 100b.

Figure 8:
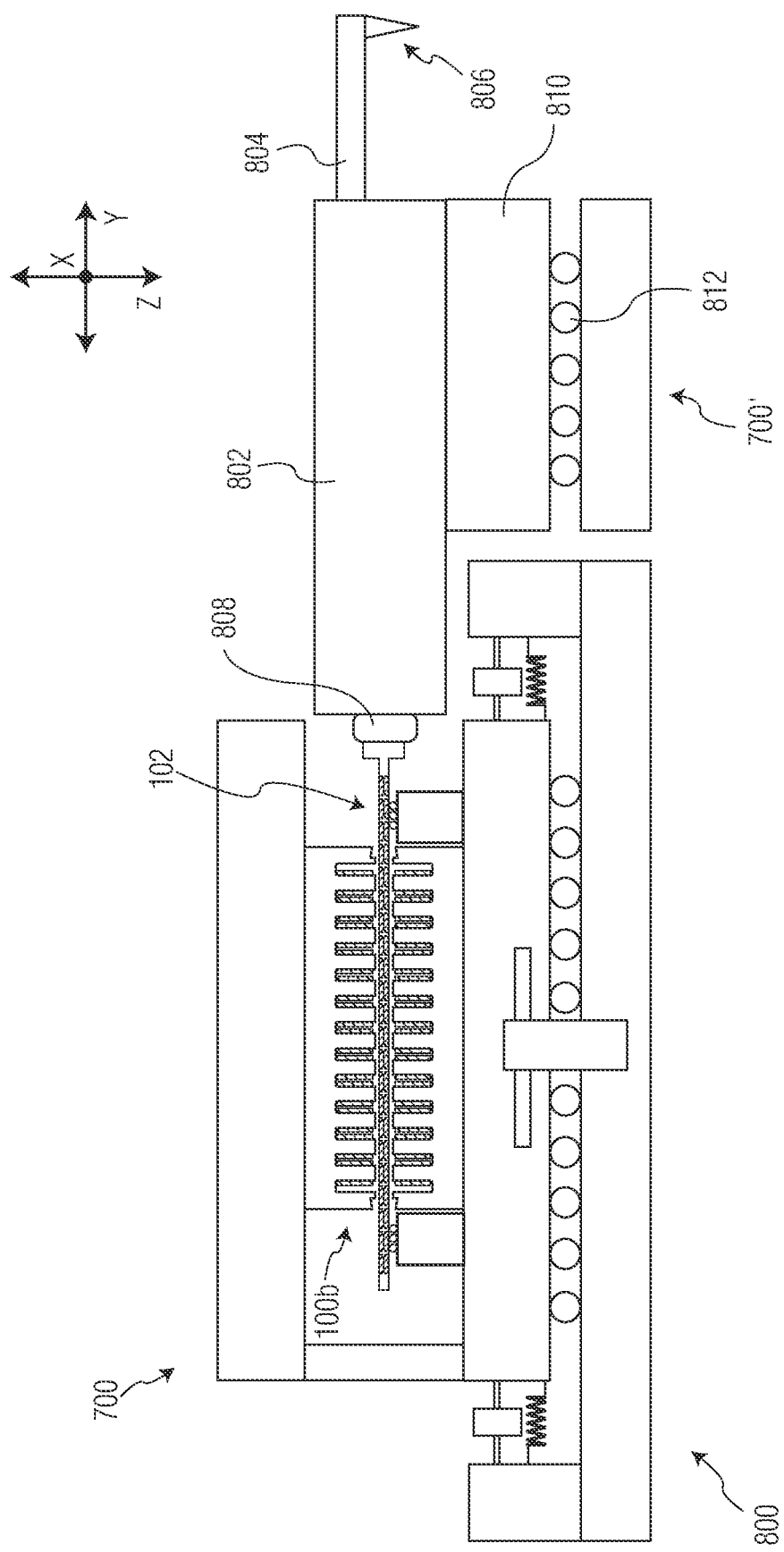
FIG. 8 is a cross-sectional block diagram of a wire bonding machine including the linear motor of FIG. 7 in accordance with an exemplary embodiment of the invention.

FIG. 8 illustrates wire bonding system 800 including linear motion system 700 from FIG. 7. Wire bonding system 800 also includes bond head assembly 804 (carrying wire bonding tool 806), y-axis slide 802, bearing block 810 (for supporting y-axis slide 802), and bearings 812. As will be appreciated by those skilled in the art, y-axis slide 802 may incorporate bearing block 810 (i.e., y-axis slide 802 would be carried on bearings 812 directly). Motion of moving magnet assembly 102 along the y-axis results in corresponding motion of bond head assembly 804. Wire bonding system 800 also includes linear motion system 700' which carries y-axis slide 802 and bearing block 810 along bearings 812. While shown as a block in FIG. 8, it is understood that linear motion system 700' is a linear motion system within the scope of the invention, such as a duplicate of linear motion system 700. Linear motion system 700' provides linear motion of bond head assembly 804 along the x-axis of wire bonding system 800 (where the x-axis is substantially perpendicular to the y-axis). Wire bonding system 800 also includes a decoupling element 808 for decoupling operation of linear motion system 700 from operation of linear motion system 700'. Thus, operation of linear motion system 700 is decoupled from operation of linear motion system 700'.

Figure 9A:
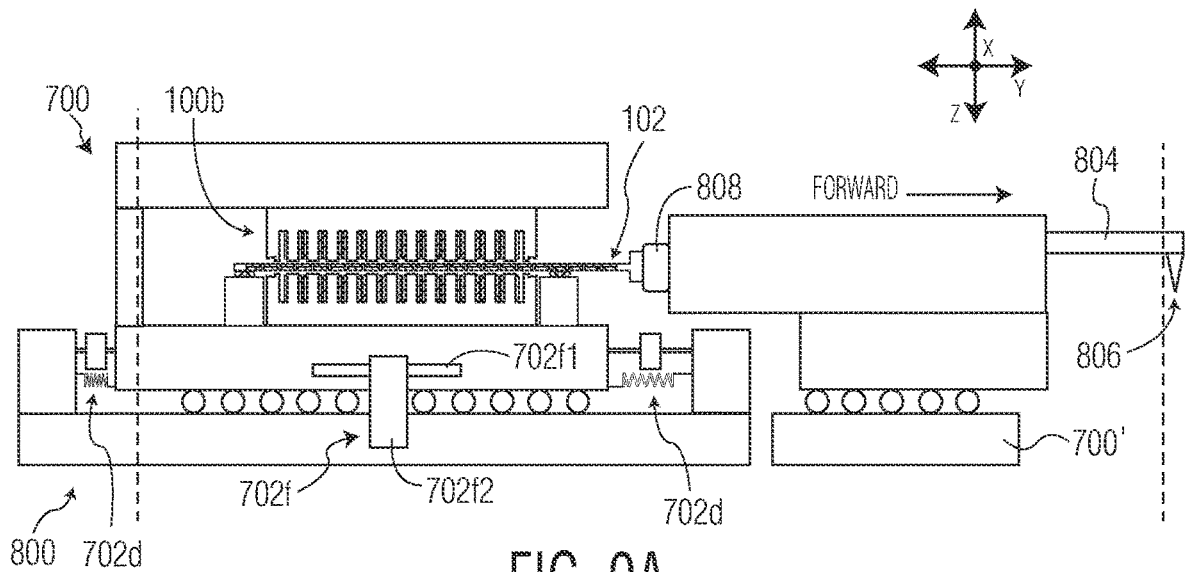
FIGS. 9A-9C are various cross-sectional block diagram views of the wire bonding machine of FIG. 8 in accordance with an exemplary embodiment of the invention.
Figure 9B:
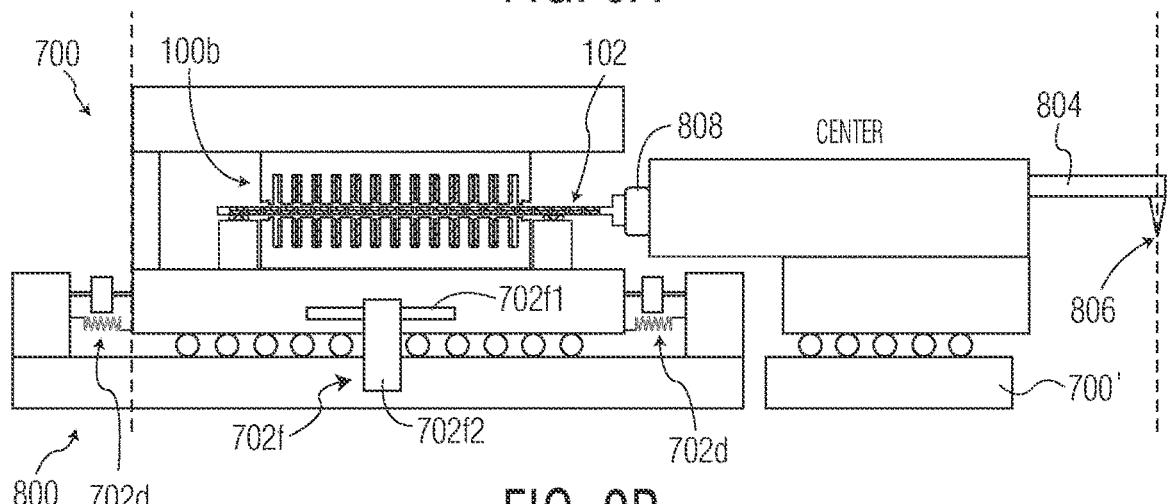
Figure 9C:
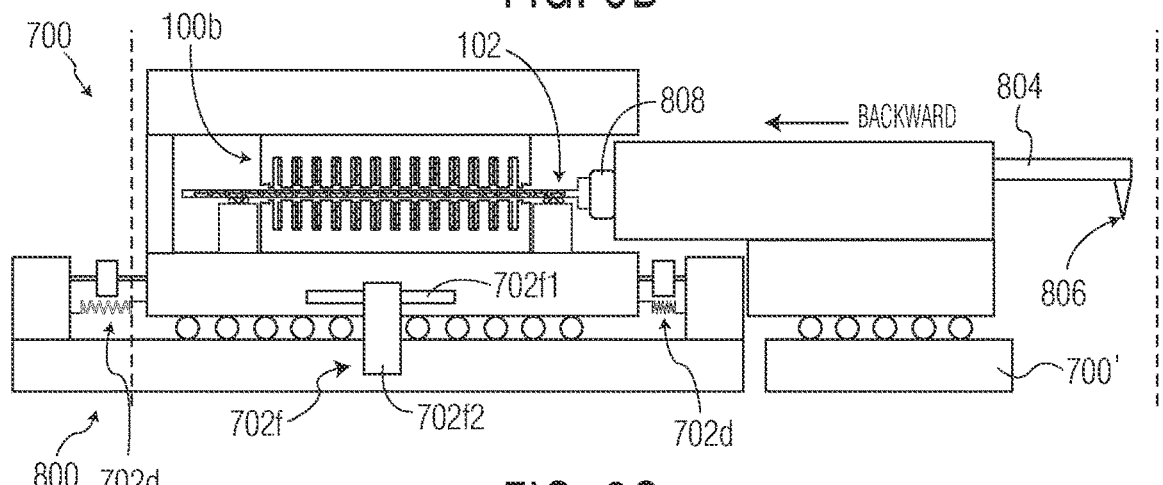

FIGS. 9A-9C illustrate operation of linear motor 100b along the y-axis of wire bonding machine 800. In FIG. 9A, wire bonding tool 806 (carried by bond head assembly 804) is moved to the right ("FORWARD") in the drawing, resulting in a reverse motion of the common housing (shown as compression of the left spring element 702d). In FIG. 9B, wire bonding tool 806 is shown in its centered position. In FIG. 9C, wire bonding tool 806 (carried by bond head assembly 804) is moved to the left ("BACKWARD") in the drawing, resulting in a reverse motion of the common housing (shown as compression of the right spring element 702d).

The linear motors of the invention may find application in a number of technical fields. One exemplary area of use is with a wire bonding machine, wherein a linear motor according to the present invention may be used to provide linear motion along the x-axis or the y-axis, or both. More specifically, for example, such linear motors may be used to provide linear motion to a bond head assembly of a wire bonding machine along the x-axis of the bond head assembly, the y-axis of the bond head assembly, or both. Of course, the linear motors of the invention will find use in any of a number of other technical fields.

Although certain embodiments (see FIG. 8) of the invention show the y-axis slide 802 carried by the x-axis linear motion system 700', it is understood that this is exemplary in nature. In a different embodiment within the scope of the invention, an x-axis slide may be carried by a y-axis linear motion system.

Although aspects of the invention are illustrated with respect to linear motors including 6 coils and 12 coils, the invention is not limited thereto. These are examples, and any number of coils may be provided, as desired, within the scope of the invention.

Although the invention is illustrated with respect to exemplary tooth designs (including end teeth, and intermediate teeth between the end teeth), it is understood that all tooth designs are exemplary in nature—and any other tooth design may be incorporated, as desired, within the scope of the invention.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A wire bonding system comprising:
    a bond head assembly configured for carrying a wire bonding tool; and
    a linear motor system for driving the bond head assembly along a first horizontal axis, the linear motor system including
        a moving magnet assembly including (i) a magnet track and (ii) a plurality of permanent magnets coupled to the magnet track,
        a first coil assembly arranged adjacent the moving magnet assembly, the first coil assembly including a first plurality of teeth having first slots therebetween, the first coil assembly also including a first plurality of coils at least partially disposed in at least a portion of the first slots,
        a position encoder system, the position encoder system for providing position information related to the first coil assembly,
        a damper element positioned between the first coil assembly and a base structure of the linear motor system, and
        a spring element positioned between the first coil assembly and the base structure of the linear motor system.

2. The wire bonding system of claim 1 wherein the first coil assembly includes a plurality of laminations defining each of the first plurality of teeth.

3. The wire bonding system of claim 1 further comprising a second coil assembly arranged on an opposite side of the moving magnet assembly as compared to the first coil assembly, the second coil assembly including a second plurality of teeth having second slots therebetween, the second coil assembly also including a second plurality of coils at least partially disposed in at least a portion of the second slots.

4. The wire bonding system of claim 3 wherein the plurality of permanent magnets includes a first plurality of magnets coupled to the magnet track facing the first coil assembly, and a second plurality of permanent magnets coupled to the magnet track facing the second coil assembly, each of the first plurality of magnets being positioned directly above a corresponding one of the second plurality of permanent magnets to form a magnet pair.

5. The wire bonding system of claim 4 wherein each of the first plurality of permanent magnets and each of the second plurality of permanent magnets is connected to the magnet track using at least one of an adhesive and a fastener.

6. The wire bonding system of claim 1 wherein the magnet track is formed from a non-magnetic material.

7. The wire bonding system of claim 6 wherein the non-magnetic material includes aluminum.

8. The wire bonding system of claim 1 wherein an exposed surface of each of the plurality of magnets is positioned adjacent the first coil assembly at a first distance.

9. The wire bonding system of claim 1 wherein the magnet track defines a plurality of tab portions, and each of the plurality of permanent magnets includes a stepped portion configured to mate with corresponding ones of the plurality of tab portions.

10. The wire bonding system of claim 1 wherein motion of the moving magnet assembly along a horizontal axis results in motion of the first coil assembly along the horizontal axis.

11. The wire bonding system of claim 1 wherein the position encoder system is selected from a group consisting of an optical encoder system and a magnetic encoder system.

12. The wire bonding system of claim 1 wherein the position encoder system includes (i) a scale portion coupled to the first coil assembly, and (ii) an optical portion for imaging the scale portion, the optical portion being coupled to another portion of the wire bonding system that does not move with the first coil assembly.

13. The wire bonding system of claim 1 wherein the linear motor system includes a three phase motor, and wherein the position information provided by the position encoder system is used to control a commutation angle of the linear motor system.

14. The wire bonding system of claim 1 further comprising another of the linear motor system for driving the bond head assembly along a second horizontal axis, the second horizontal axis being substantially perpendicular to the first horizontal axis.

15. The wire bonding system of claim 14 further comprising a decoupling element for decoupling the linear motor system from the another of the linear motor system.

16. The wire bonding system of claim 1 further comprising a y-axis slide configured to connect with a coupling portion of the magnet track.

17. The wire bonding system of claim 1 wherein the spring element is positioned between a first end of the linear motor system and the base structure, the linear motor system including another spring element positioned between a second end of the linear motor system and the base structure.

18. The wire bonding system of claim 1 wherein the damper element is positioned between a first end of the linear motor system and the base structure, the linear motor system including another damper element positioned between a second end of the linear motor system and the base structure.

* * * * *